(12) United States Patent
Bauer et al.

(10) Patent No.: US 11,305,937 B2
(45) Date of Patent: Apr. 19, 2022

(54) PROCESS CONTROL SYSTEM

(71) Applicant: KUKA Systems GmbH, Augsburg (DE)

(72) Inventors: Andreas Bauer, Augsburg (DE); Horst-Moritz Maus, Augsburg (DE)

(73) Assignee: KUKA Systems GmbH, Augsburg (DE)

( * ) Notice: Subject to any disclaimer, the term of this patent is extended or adjusted under 35 U.S.C. 154(b) by 212 days.

(21) Appl. No.: 16/618,715

(22) PCT Filed: May 25, 2018

(86) PCT No.: PCT/EP2018/063763
§ 371 (c)(1),
(2) Date: Dec. 2, 2019

(87) PCT Pub. No.: WO2018/219796
PCT Pub. Date: Dec. 6, 2018

(65) Prior Publication Data
US 2020/0156870 A1  May 21, 2020

(30) Foreign Application Priority Data

Jun. 2, 2017 (DE) .................... 10 2017 005 350.2

(51) Int. Cl.
*B65G 1/137* (2006.01)
*G05B 19/418* (2006.01)

(52) U.S. Cl.
CPC ..... *B65G 1/1375* (2013.01); *G05B 19/41895* (2013.01); *G05B 2219/32283* (2013.01); *G05B 2219/50393* (2013.01)

(58) Field of Classification Search
CPC combination set(s) only.
See application file for complete search history.

(56) References Cited

U.S. PATENT DOCUMENTS

| 2006/0230403 | A1  | 10/2006 | Crawford et al. |
| 2014/0257546 | A1* | 9/2014  | Mizutani ............ G05B 19/0421 700/108 |
| 2015/0005903 | A1* | 1/2015  | Worek ............. G05B 19/41885 700/44 |

FOREIGN PATENT DOCUMENTS

| EP | 1457854 A1 | 9/2004 |
| EP | 2784614 A2 | 10/2014 |
| GB | 2127582 A  | 4/1984 |

OTHER PUBLICATIONS

Industry 4.0—How to navigate digitization of the manufacturing sector. McKinsey Digital 2015 <https://www.mckinsey.de/files/mck_industry_40_report.pdf>.

(Continued)

*Primary Examiner* — Kyle O Logan
(74) *Attorney, Agent, or Firm* — Dorton & Willis, LLP (57) ABSTRACT

A process control system for a facility that has a station arrangement including at least one at least partially automated working station and a vehicle arrangement including at least one at least partially automated transport vehicle for transporting material to be conveyed to, in and/or from the station arrangement. The process control system includes a process means for planning, implementing and/or observing, particularly monitoring processes of the station arrangement, a fleet means for planning, implementing and/or observing, particularly monitoring movements of the vehicle arrangement, and a working means arrangement with at least one working means for controlling and/or monitoring at least one working station of the station arrangement. The process and fleet means and/or the process means and the working means arrangement and/or the fleet means and the working means arrangement are configured to communicate with each other.

27 Claims, 1 Drawing Sheet

(56) References Cited

OTHER PUBLICATIONS

European Patent Office; Search Report in related International Patent Application No. PCT/EP2018/063763 dated Aug. 8, 2018; 3 pages.
European Patent Office; Written Opinion in related International Patent Application No. PCT/EP2018/063763 dated Aug. 8, 2018; 8 pages.
German Patent Office; Examination Report and Summons to Attend Oral Proceedings in related German Patent Application No. 10 2017 005 350.2 dated Feb. 6, 2018; 6 pages.
European Patent Office; Office Action in related European Patent Application No. 18 726 810.7 dated Jun. 8, 2021; 7 pages.

\* cited by examiner

PROCESS CONTROL SYSTEM

CROSS-REFERENCE TO RELATED APPLICATIONS

This application is a national phase application under 35 U.S.C. § 371 of International Patent Application No. PCT/EP2018/063763, filed May 25, 2018 (pending), which claims the benefit of priority to German Patent Application No. DE 10 2017 005 350.2, filed Jun. 2, 2017, the disclosures of which are incorporated by reference herein in their entirety.

TECHNICAL FIELD

The present invention relates to a process controller for a facility comprising at least one workstation and at least one transport vehicle, to a system comprising a facility and the process controller for controlling the facility, to a method for controlling a facility using the process controller, and to a computer program product for carrying out the method.

BACKGROUND

Programmable logic controllers ("PLC") for controlling workstations by means of robots are known from in-house practice. In addition, fleet managers for directing automated transport vehicles are known from in-house practice.

SUMMARY

The object of the present invention is that of improving control of a facility comprising at least one workstation and at least one transport vehicle.

This object is achieved by a process controller, a method, a system comprising the facility and a process controller described herein for controlling the facility, and a computer program product for carrying out a method as described herein.

According to an embodiment of the present invention, a facility comprises a station arrangement comprising one or more workstations which (in each case) is/are automated in part or completely, or works/work in a partially or fully automated manner, or is/are designed or used therefor.

In a development, the or one or more of the workstation(s) (in each case) comprises/comprise one or more robots and/or is/are (in each case) controlled in a partially or fully automated manner using work means or is designed therefor or is used therefor.

The present invention can be implemented particularly advantageously in robot facilities of this kind; in particular, facilities or workstations of this kind can advantageously carry out various processes in a particularly variable manner, in particular electively and/or on a case-by-case basis or as required.

According to an embodiment of the present invention, the facility comprises a vehicle arrangement comprising one or more transport vehicles which (in each case) is/are automated in part or completely, or moves/move in a partially or fully automated manner, or is/are designed or used therefor.

In a development, the or one or more of the transport vehicle(s) (in each case) comprises/comprise an in particular rail-mounted or non-rail-mounted chassis, in particular a wheeled, track-laying or crawler chassis, and/or a vehicle control system for at least partially automated steering of the vehicle, and/or transports/transport goods to be conveyed, in particular starting products, in particular starting materials, and/or semi-finished products, end products and/or tools to, within and/or from the station arrangement, in particular to, from and/or between the or one or more of the work station(s), or is/are designed or used therefor. In an embodiment, the or one or more of the transport vehicle(s) is/are (in each case) a driverless (operating) vehicle or what is known as an AGV ("automatic guided vehicle").

The present invention can be implemented particularly advantageously in facilities comprising transport vehicles of this kind; in particular, facilities or transport vehicles of this kind can advantageously carry out various processes in a particularly variable manner, in particular electively and/or on a case-by-case basis or as required.

Accordingly, in one embodiment the facility is what is known as a matrix facility, comprising a plurality of workstations that can be used in a variable manner, and one or more material and/or tool stores which interact in a variable manner, by means of the vehicle arrangement or the transport vehicles thereof, in particular the vehicle arrangement supplies the workstations and/or stores in a variable manner with material and/or tools from the stores and/or from other workstations, or the facility is designed therefor.

According to an embodiment of the present invention, a process controller that controls the facility or is designed therefor, in particular in terms of hardware and/or software, in particular in terms of program technology, or is used therefor, in particular a process controller of a system according to the present invention comprising the facility, comprises:

a processing means that plans, executes, in particular commands, and/or observes, in particular monitors, processes of the station arrangement, or is designed therefor, in particular in terms of hardware and/or software, in particular in terms of program technology, or is used therefor;

a fleet means that plans, executes, in particular commands, and/or observes, in particular monitors, movements of the vehicle arrangement, or is designed therefor, in particular in terms of hardware and/or software, in particular in terms of program technology, or is used therefor; and a work means arrangement comprising one or more work means that (in each case) communicates/communicate with the or one or more of the workstation(s) of the station arrangement.

In one embodiment, commanding a process of the station arrangement can comprise, in particular be, carrying out an issue, download and/or callup, in particular a trigger or startup, of an, in particular stored, program for the station arrangement, in particular one or more of the workstations thereof, in particular one or more of the components thereof, in particular robots, for carrying out said process by the facility or the station arrangement thereof.

In one embodiment, commanding a movement of a transport vehicle can comprise, in particular be, carrying out a specification or issue of intended or target positions, in particular an, in particular temporal and/or ordered, sequence of such positions, for carrying out said movement by means of the vehicle arrangement or the transport vehicles thereof.

According to one embodiment of the present invention, the processing means and the fleet means communicate with one another or are designed therefor, in particular in terms of hardware and/or software, in particular in terms of program technology.

As a result, in one embodiment planning, execution and/or observation of processes of the station arrangement, and planning, execution and/or observation of movements of the vehicle arrangement can advantageously be interlinked, in particular matched to one another, in particular interact.

Thus, for example when planning processes of different workstations, the provision and/or collection of starting products, in particular starting materials and/or semi-finished products, end products and/or tools by the transport vehicle of the vehicle arrangement can be taken into account, in particular can be planned on the basis of the planned processes, and/or the processes can optionally be replanned accordingly.

In addition or alternatively, according to one embodiment of the present invention the processing means and the work means arrangement communicate with one another or are designed therefor, in particular in terms of hardware and/or software, in particular in terms of program technology.

As a result, in one embodiment the processing means can advantageously execute and/or observe planned processes by means of the work means arrangement or the work means thereof, in particular can monitor said processes and/or possibly replan said processes accordingly, on the basis of feedback from the work means arrangement.

In addition or alternatively, according to one embodiment of the present invention the fleet means and the work means arrangement communicate with one another or are designed therefor, in particular in terms of hardware and/or software, in particular in terms of program technology.

As a result, in one embodiment the work means can advantageously order, direct, actuate and/or observe transport vehicles.

In one embodiment it is thus possible, in particular by means of communication between the processing and fleet means and work means arrangement, within or by means of the process controller, in particular corresponding (communications) interfaces, for processes of workstations and transport therebetween to be matched to one another, in particular controlled and/or monitored in an interlinked manner.

In addition or alternatively, according to one embodiment of the present invention, the processing and fleet means, and/or processing means and work means arrangement, and/or fleet means and work means arrangement are synchronized with one another, in particular in a clocked or cyclical manner, in particular on the basis of a common time (in each case), in particular an overall (facility) time, or are designed therefor, in particular in terms of hardware and/or software, in particular in terms of program technology.

As a result, it is possible in one embodiment for synchronization of the station arrangement and the vehicle arrangement to be achieved or improved, in particular with respect to untimed planning of movements of a vehicle arrangement, i.e. a merely assorted sequence of positions to be entered by the transport vehicles thereof.

In one embodiment, the process controller comprises user means, via which data, in particular parameters, in particular for planning the processes and/or movements, are input by an operator, and/or data, in particular current and/or planned states of the workstations and/or transport vehicles, are output to an operator, in particular displayed visually or graphically, or is designed therefor, in particular in terms of hardware and/or software, in particular in terms of program technology.

In a development, the user and the processing means, and/or the user and the fleet means, and/or the user means and the work means arrangement, communicate with one another or are designed therefor, in particular in terms of hardware and/or software, in particular in terms of program technology.

As a result, in one embodiment the planning of processes and/or movements can be influenced, in particular parameterized, and/or the execution of processes and/or positions, in particular movements, of the transport vehicles, can be displayed.

In one embodiment, the processing means and the fleet means, and/or the processing means and the work means arrangement, and/or the fleet means and the work means arrangement, and/or the user means and the processing means, and/or the user means and the fleet means, and/or the user means and the work means arrangement communicate with one another on the basis of an, in particular service-oriented, protocol, in particular an OPC ("open platform communications") protocol, an OPC-UA ("OPC-unified architecture") protocol, in particular in accordance with IEC 62541, or an OPC-UA-like protocol, in particular a MQTT ("message queue telemetry transport") protocol, or the like.

As a result, in one embodiment particularly advantageous communication can be achieved within the process controller, and/or the means thereof can be interlinked particularly advantageously.

In one embodiment, the processing means plans processes of the station arrangement, in particular the or one or more of the workstations thereof, and/or one or more of the components thereof, in particular robots, on the basis of starting products, in particular starting materials and/or semi-finished products, and/or end products, and/or process step sequences, in particular temporally, in particular in a (time) deterministic manner and/or having deterministic or, in particular reliably, predictable time(point)s, and/or in reverse and/or while the station arrangement carries out processes, or is designed therefor, in particular in terms of hardware and/or software, in particular in terms of program technology.

In one embodiment, the starting products and/or end products and/or process step sequences are specified at least in part, in particular in the form of lists and/or by a user, partially or fully automated production planning, a partially or fully automated goods management system, or the like.

As a result, in one embodiment processes can advantageously be planned in an at least partially automated manner, by specifying the corresponding starting products, end products or process step sequences.

It is thus possible, for example, in one embodiment, for the processing means to plan mounting of a vehicle door on one workstation, if the vehicle door (front/rear, left/right, etc.) and/or the vehicle (production series, color, etc.) and/or the mounting step sequence (gripping, placing, fastening, etc.) are specified.

In one embodiment, reverse planning, i.e. starting at a temporally later, in particular last, processing step, in particular production step, and then continuing, in particular progressively, with or to a temporally earlier, in particular (respectively) preceding, processing or production step, can reduce the risk of a planning deadlock.

In general, in one embodiment, the processing means plans processes of the station arrangement in a temporal manner, in particular in a (time) deterministic manner and/or having deterministic or, in particular reliably, predictable time(point)s, or is designed therefor, in particular in terms of hardware and/or software, in particular in terms of program technology. In addition or alternatively, in one embodiment, the fleet means plans movements of the vehicle arrangement in a temporal manner, in particular in a (time) deterministic manner and/or having deterministic or, in particular reliably, predictable time(point)s, or is designed therefor, in particular in terms of hardware and/or software, in particular in terms of program technology.

In one embodiment, temporal planning comprises, in a general manner, planning having specified or defined timepoints, in particular in order to achieve or have available a process state, in particular success or progress, and/or time durations, in particular for carrying out process steps, and/or having specified or defined timepoints, in particular for achieving, holding and/or leaving a position, and/or time durations, in particular for a stay at and/or a transfer between specified places of the facility, in particular nodes of a network plan or graph. In one embodiment, temporal planning comprises planning future processes, movements and/or timepoints or time durations.

As a result, it is possible, in one embodiment, for individual processes and/or movements to be synchronized and/or carried out in parallel, at least in part.

It is thus possible, in one embodiment, for the process controller to plan the positions of individual transport vehicles at specified future timepoints, and/or to take said timepoints into account in the process planning, and/or to plan the states of the individual workstations at, in particular the same and/or different, specified future timepoints, and/or to take said timepoints into account in the movement planning for the transport vehicles. In general, in one embodiment, the processing means and/or fleet means plan in a (time) deterministic manner and/or having deterministic or, in particular reliably, predictable time(point)s.

In one embodiment, planning while the station arrangement is (already) carrying out processes, makes it possible for (subsequent) processes to be (dynamically) planned in advance, and/or for processes currently being carried out to be (dynamically) replanned.

In one embodiment, planning generally also comprises optimization or planning, while reducing, in particular minimizing, a one-dimensional or multi-dimensional quality criterion.

As a result, in one embodiment the (planned) processes and/or movements can in each case be improved, in particular planned quickly and/or promptly.

In addition or alternatively, in one embodiment the processing means allocates various workstations of the station arrangement for carrying out processes of the station arrangement, in particular planned by the processing means, and/or, in particular by communicating with the fleet means, transport vehicles of the vehicle arrangement for carrying out processes of the station arrangement, in particular planned by the processing means, in particular for providing and/or collecting starting products, in particular starting materials and/or semi-finished products, end products and/or tools at workstations by means of transport vehicles, in particular while the station arrangement carries out processes, or is designed therefor, in particular in terms of hardware and/or software, in particular in terms of program technology.

In the example mentioned above, it is thus possible, for example, for the processing means to allocate, for planned assembly of a vehicle door, a workstation that is suitable therefor and is (still) free for the assembly time, and AGVs, which are still free at the corresponding times, for transporting away the door(s), fastening means or the like.

As a result, in one embodiment the processing means can advantageously plan the processes, in particular make optimum use of available resources.

In one embodiment, the fleet means communicates with the vehicle arrangement via one or more fleet managers, and in a development communicates with the or one or more of the transport vehicles, alternatively via one (selected one) of a plurality of (provided, in particular existing) fleet managers, and/or with at least one first of the transport vehicles via a (first) fleet manager and with at least one second of the transport vehicles via a further (second) fleet manager, or is designed therefor, in particular in terms of hardware and/or software, in particular in terms of program technology.

In one embodiment, a fleet manager directs, in particular controls and/or monitors, transport vehicles, and/or, in one embodiment, communicates, in particular for this purpose, therewith directly and/or in a wireless or wired manner.

As a result, in one embodiment the process controller can advantageously use various fleet managers and thus be adjusted to different fringe or operating conditions. In addition or alternatively, it is thus possible for other means of the process controller, in particular the processing means thereof and/or the user means thereof and/or the or one or more work means of the work means arrangement thereof, to communicate (in each case), via the fleet manager(s), with transport vehicles.

In this way, it is possible, for example, for an, in particular programmable logic, station controller to communicate with a transport vehicle communicating with the fleet manager at the workstation, in particular trigger this and/or detect the position thereof, in order to control and/or monitor a workstation of the station arrangement, by means of the work means communicating with said station arrangement, the fleet means communicating with said workstation, and the fleet means communicating with said fleet manager.

In addition or alternatively, in one embodiment, the fleet means plans stays of transport vehicles of the vehicle arrangement at various specified places, in particular workstations, in particular various positions within the workstations, and/or charging stations, in particular for charging transport vehicles of the vehicle arrangement with electrical energy and/or fuel, of the facility, in particular in a temporal manner, in particular in a (time) deterministic manner and/or having deterministic or, in particular reliably, predictable time(point)s, and/or while the station arrangement carries out processes, or is designed therefor, in particular in terms of hardware and/or software, in particular in terms of program technology.

In one embodiment, the places are nodes of a graph. In one embodiment, temporal planning of stays of transport vehicles at specified places or nodes comprises allocating or reserving of time windows at the corresponding place or node, for the corresponding transport vehicles.

As a result, in one embodiment the path planning of the vehicle arrangement can advantageously be carried out by the fleet means of the process controller and accordingly in particular be matched with or to the process planning thereof, and/or take place independently of the fleet manager(s) used.

In one embodiment, the or one or more work means of the work means arrangement communicates/communicate (in each case) with an, in particular programmable logic, station controller, and/or a station controller that is, in particular temporarily, associated with said work means, i.e. in particular a PLC and/or a robot controller, in order to control and/or monitor one or more workstation(s) (in each case) of the station arrangement, in particular one or more of the components thereof, in particular while the station arrangement carries out processes, or is/are designed therefore, in particular in terms of hardware and/or software, in particular in terms of program technology.

As a result, in one embodiment, existing, in particular conventional, station controllers, can be or are used by the process controller, via the work means of the work means arrangement associated with said station controllers, for executing and/or monitoring. It is thus in particular possible for the process controller, in particular the processing means thereof, to transfer work programs to station controllers via the work means arrangement, and/or to make selections in and/or to start said work programs, in particular on the basis of processes planned by the process controller or processing means. In addition or alternatively, in one embodiment station controllers can communicate with transport vehicles via the work means arrangement and the fleet means, in particular can displace said transport vehicles or issue corresponding (start and/or stop) commands to said vehicles and/or monitor said vehicles, in particular take account of the position(s) thereof.

A means within the meaning of the present invention can be designed so as to be hardware-based and/or software-based, and can in particular comprise an in particular digital processing unit, in particular microprocessor unit (CPU), which is preferably in data or signal connection with a memory and/or bus system, and/or one or more programs or program modules. The CPU can be designed to process commands that are implemented as a program stored in a memory system, to detect input signals from a data bus, and/or to emit output signals to a data bus. A memory system may comprise one or more, in particular different, storage media, in particular optical, magnetic, solid state, and/or other nonvolatile media. The program can be configured such that it embodies or is capable of executing the methods described herein, such that the CPU can carry out the steps of such methods and can thus in particular control the facility. In one embodiment, a computer program product can comprise, in particular be, an, in particular nonvolatile, storage medium for storing a program or having a program stored thereon, execution of said program triggering a system or a controller, in particular a computer, to execute a method described herein or one or more of the steps thereof.

In one embodiment, one or more, in particular all, of the steps of the method are carried out in a completely or partially automated manner, in particular by the process controller or the means thereof.

In one embodiment, a means, in particular the processing means, the fleet means and/or the or one or more of the work means of the work means arrangement can (in each case) comprise, in particular be, an interface, in particular the fleet means can comprise or be an interface for communication with the fleet manager(s), and/or a work means can comprise or be an interface for communication with the station controller that is, in particular temporarily or permanently, associated therewith.

The present invention can particularly advantageously be used in the body framework, or the process controller or facility or the method or system can be used therefor.

In one embodiment, the processing means is, in particular acts in a manner, superordinate to the fleet means and/or the work means arrangement. As a result, in one embodiment said processing means can carry out (process) control of the facility in a primary or superordinate manner, the fleet means and/or work means arrangement being, in particular acting, in a manner subordinate or secondary (thereto).

As a result, in one embodiment, the facility can particularly advantageously be (process) controlled, in particular process-optimized, and/or the communication and/or synchronization of the processing means and fleet means, and/or processing means and work means arrangement, and/or fleet means and work means arrangement, can be improved.

In addition or alternatively, in one embodiment the processing means can plan, execute, in particular command, and/or observe, in particular monitor, processes of two or more workstations of the station arrangement in a centralized manner, in particular together and/or in one instance or unit, in particular a computer, or can be designed therefor, in particular in terms of hardware and/or software, in particular in terms of program technology, or can be used therefor.

As a result, in one embodiment the security and/or efficiency can be improved compared with decentralized, in particular autonomous, planning, execution or observation of processes of the station arrangement.

In addition or alternatively, in one embodiment the processing means can plan, execute, in particular command, and/or observe, in particular monitor, processes of the station arrangement using, in particular on the basis of, artificial intelligence ("AI"), or can be designed therefor, in particular in terms of hardware and/or software, in particular in terms of program technology, or can be used therefor.

As a result, in one embodiment the (process) controller of the facility can (even) better, in particular in combination with the superordinate and/or central (centrally acting) processing means, optimize processes of the station arrangement, and/or better match said processes to the transport of goods to be conveyed.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
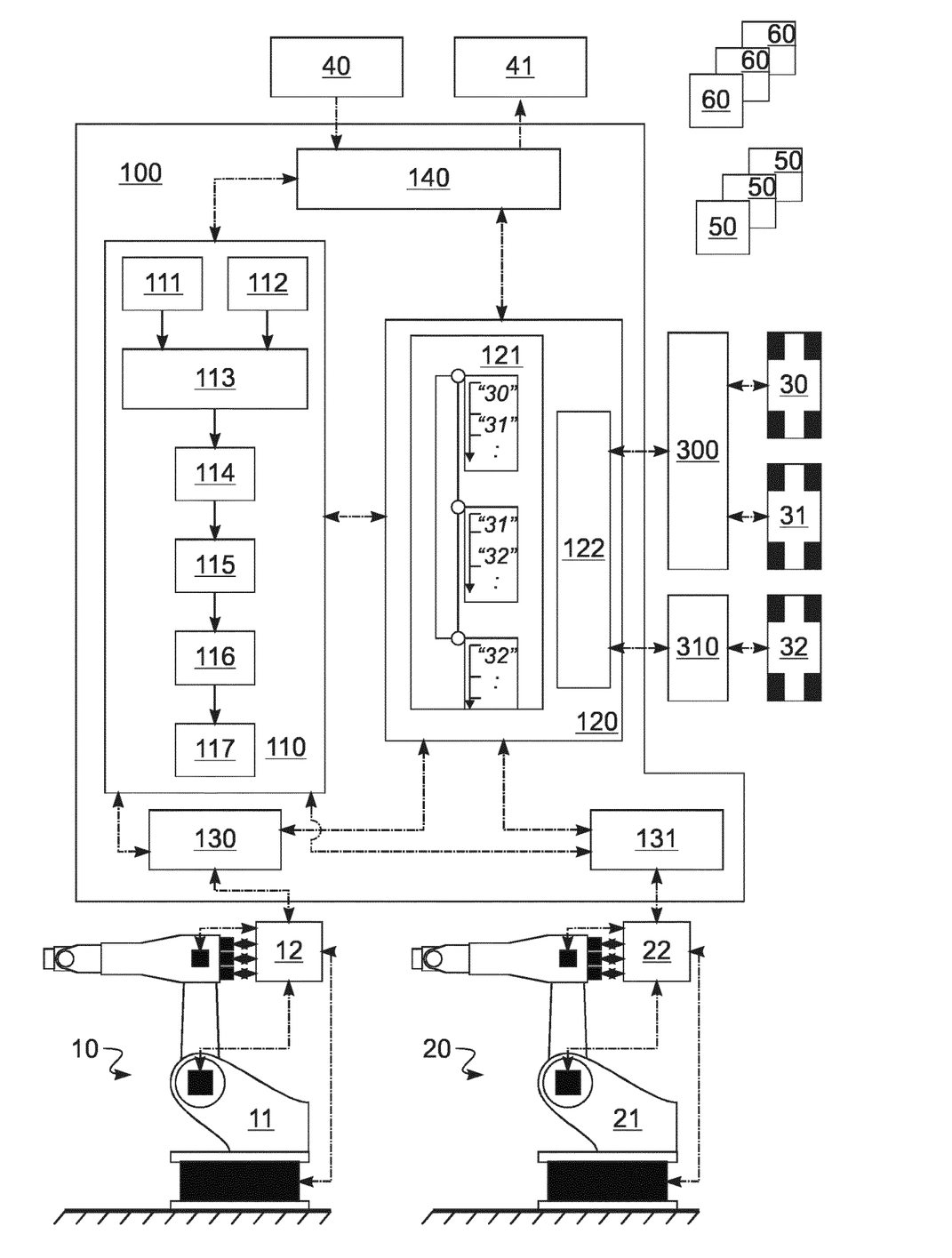
FIG. 1 shows part of a system comprising a facility and a process controller for controlling the facility according to an embodiment of the present invention.

FIG. 1 shows part of a system comprising a facility and a process controller 100 for controlling the facility according to an embodiment of the present invention.

The facility comprises a station arrangement comprising, in the embodiment, by way of example two, workstations 10, 20 and a vehicle arrangement comprising, in the embodiment, by way of example three, automated transport vehicles in the form of AGVs 30, 31 and 32 for transporting goods to be conveyed to and from, in particular between, the workstations 10, 20 of the station arrangement and the stores 50 of the facility.

In the embodiment, the workstations 10, 20 each comprise one robot 11 and 21, respectively, and one PLC 12 and 22, respectively, for controlling and/or monitoring the workstation, in particular the relevant robot.

In a modification that is not shown, it is of course possible for more and/or different types of workstations and/or transport vehicles to be provided and to be controlled by the process controller 100. In addition or alternatively, a PLC can for example also control a plurality of robots.

The process controller 100 comprises a processing means 110 for centralized planning, execution and/or observation, in particular monitoring, of processes of the station arrangement 10, 20, a fleet means 120 that is subordinate to said processing means and is intended for planning, execution and/or observation, in particular monitoring, of movements of the vehicle arrangement 30-32, and a work means arrangement comprising a work means 130 for communication with the workstation 10 associated therewith, and a work means 131 for communication with the workstation 20 associated therewith, which is also subordinate to the processing means 110.

In addition, the process controller 100 comprises a user means 140 for input of data 40 by an operator and for outputting data 41 to an operator.

The processing means 110, fleet means 120, work means arrangement 130, 131 and user means 140 communicate with one another, as indicated in dashed lines in FIG. 1.

A means 113 of the processing means 110 plans processes of the station arrangement 10, 20 on the basis of lists of starting and/or end products 111 and process step sequences 112.

If, for example in car body manufacture, doors and windows are to be mounted, the means 113 can plan this, in particular temporally, on the basis of the car bodies and the doors and windows to be mounted thereon (starting products) or on the basis of the car bodies fitted with doors and windows that are to be created (end products), and the steps necessary therefor, for example can allocate the door mounting to the workstation 10 and the window mounting to the workstation 20 the window mounting, which is in particular temporally coordinated therewith, and can also plan the process in the individual workstations, in particular temporally, for example the sequence of the doors or windows to be mounted and/or the sequence of the steps necessary therefor in each case, for example gripping the corresponding component, arranging it on the car body, and subsequently fastening it thereto.

For this purpose, a means 114 of the processing means 110 allocates the corresponding workstations or reserves these for specific time periods in each case, the duration and sequence of which time periods result from the process planning of the means 113.

A means 115 of the processing means 110 allocates transport vehicles 30-32 for delivering or collecting the corresponding parts to or from the corresponding workstations at the corresponding times, and/or for positioning and/or moving the corresponding parts in the corresponding workstations, in accordance with the process planning of the means 113.

In particular, for this purpose the (means 114 of the) processing means 110 communicates with the fleet means 120, in particular the means 121 thereof, which means temporally plans stays of transport vehicles of the vehicle arrangement at various specified places.

As indicated schematically in FIG. 1, for this purpose the means 121 reserves time windows for the different transport vehicles 30-32 at different nodes of a graph or network plan.

If the means 121 identifies that the times of the transport vehicles 30-32 at the corresponding workstations that are required by the means 114 cannot be realized, it provides a notification thereof, whereupon means 113, 114 replan accordingly.

In addition to the means 121, the fleet means 120 comprises a means 122 which communicates with the vehicle arrangement 30-32 via fleet managers 300, 310.

In this case, in the embodiment, by way of example the fleet manager 300 controls the vehicles 30, 31, and the fleet manager 310 controls the vehicle 32. This is intended merely to illustrate the power of the process controller. In modifications that are not shown, it is also possible for merely one fleet manager, in particular optionally one of various fleet managers, to be used.

The embodiment furthermore shows that the movement of the transport vehicles of the vehicle arrangement is planned and commanded by the (means 121 of the) fleet means 120, which communicates with the fleet managers 300, 310 via the means 122, which fleet managers in turn directly control the transport vehicles 30-32.

During the planning, the means 121 can also plan (in) startup, as required, of charging stations 60 for electrically charging and/or refueling the transport vehicles.

A means 116 of the processing means 110 then executes the planned processes, in that it sends the work programs, drawn up by the means 113, for example for gripping the corresponding component, arranging it in the car body, and subsequently fastening it thereon at specific fastening points, via the work means 130, 131 to the corresponding PLC 12 and 22, respectively, or selects and activates programs already stored there.

This again illustrates the power of the process controller, because alternative and/or additional PLCs and/or other station controllers, in particular robot controllers, can be incorporated without problem, by corresponding work means assigned thereto.

The embodiment furthermore illustrates that, vice versa, the PLC 12, 22 can command and/or monitor the transport vehicles by means of the process controller 100, in particular by means of the work means 130 and 131, respectively, associated therewith, and the fleet means 122, in particular the means 122 thereof, and the fleet managers 300 and 310, respectively, for example in that the PLC 12 provides a notification of an arrival of the transport vehicle 30 to the fleet manager 300 thereof, and/or triggers the entry or continuation thereof into or in the workstation 10.

In addition, a means 117 of the processing means 110 can monitor the processes carried out by the workstations 10, 20, and accordingly communicate, for this purpose, with the PLC 12, 22 thereof via the work means 130 and 131, respectively, associated therewith, such that said processing means can replan, for example resort and/or temporally displace, further processes, if required.

By means of the user means 140 that communicates with the processing means 110 and fleet means 120, a user can input data 40, for example in order to parameterize processes, or the like. In addition, the user means 140 can display data 41 to said user, in particular display current and/or planned states of the processes and/or workstations 10, 20, and/or positions of transport vehicles 30-32.

Insofar as means of the process controller 100 have been explained with reference to FIG. 1, the corresponding elements of FIG. 1 can similarly represent method steps which are carried out by said means, i.e. for example 113, 114 and 115 can equally be planning of processes, allocating of workstations and transport vehicles, as well as the means of the process controller 100 or the processing means 110 thereof that execute said steps.

FIG. 1 shows, in a compact manner, both the process controller 100 and a method carried out thereby for controlling the facility according to an embodiment of the present invention.

Although embodiments given by way of example have been explained in the preceding description, it is noted that a plurality of modifications are possible. It should furthermore be noted that the embodiments given by way of example are merely examples which are not intended to restrict the scope of protection, the applications and the structure in any way. Instead, the above description provides guidance for a person skilled in the art to implement at least one embodiment given by way of example, it being possible for various amendments to be made, in particular in view of the function and arrangement of the described components, without departing from the scope of protection as emerges from the claims and the combinations of features equivalent thereto.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

10; 20 workstation
11; 21 robot
12; 22 PLC
30-32 AGVs
40; 41 input/output data
50 (material/intermediate/end product/tool) store
60 charging station
100 process controller
110 processing means
111 list of starting and end products
112 list of work steps
113 (means for) planning processes
114 (means for) allocating workstations
115 (means for) allocating transport vehicles
116 (means for) carrying out processes
117 (means for) monitoring processes
120 fleet means
121 (means for) planning stays of transport vehicles
122 (means for) communication with transport vehicles
130, 131 work means (arrangement)
140 user means
300, 310 fleet manager

What is claimed is:

1. A process controller for a facility having a station arrangement including at least one workstation that is automated, at least in part, and a vehicle arrangement including at least one transport vehicle that is automated, at least in part, and is intended for transporting goods to be conveyed to, in, and/or from the station arrangement, the process controller comprising:
a processing means for at least one of planning, executing, or observing processes of the station arrangement;
a fleet means for at least one of planning, executing, or observing movements of the vehicle arrangement; and
a work means arrangement comprising at least one work means for communication with at least one workstation of the station arrangement;
wherein at least one of:
the processing means and fleet means,
the processing means and work means arrangement, or
the fleet means and work means arrangement, are configured for at least one of communication or synchronization with one another;
wherein the fleet means comprises means for communication with the vehicle arrangement via at least one fleet manager;
wherein the fleet means is configured to at least one of:
communicate with at least one transport vehicle of the vehicle arrangement alternatively via a selected one of several designated fleet managers, or
communicate with at least one first transport vehicle of the vehicle arrangement via a first fleet manager and with at least one second transport vehicle of the vehicle arrangement via a further fleet manager.

2. The process controller of claim 1, wherein at least one of:
executing by the processing means comprises commanding processes of the station arrangement;
observing by the processing means comprises monitoring processes of the station arrangement;
executing by the fleet means comprises commanding movements of the vehicle arrangement; or
observing by the fleet means comprises monitoring movements of the vehicle arrangement.

3. The process controller of claim 1, further comprising:
a user means for at least one of inputting data by a user or outputting data to a user;
wherein at least one of:
the user means and processing means,
the user means and fleet means, or
the user means and work means arrangement, are configured for communication with one another.

4. The process controller of claim 3, wherein at least one of:
the processing means and fleet means;
the processing means and work means arrangement;
the fleet means and work means arrangement;
the user means and processing means;
the user means and fleet means; or
the user means and work means arrangement;
are designed for communication with one another on the basis of a protocol.

5. The process controller of claim 4, wherein communication is based on a service-oriented protocol, in particular an OPC protocol, an OPC-UA protocol or an OPC-UA-like protocol.

6. The process controller of claim 1, wherein at least one workstation of the station arrangement comprises at least one robot.

7. The process controller of claim 1, wherein at least one of:
the processing means comprises at least one of:
means for planning of processes of the station arrangement on the basis of at least one of starting products, end products, or process step sequences,
means for allocating different workstations of the station arrangement for carrying out processes of the station arrangement, or
means for allocating transport vehicles of the vehicle arrangement for carrying out processes of the station arrangement; or
the processing means is at least one of:
configured for centralized planning, executing, or observing processes of at least two workstations of the station arrangement that are automated at least in part,
configured for planning, executing, or observing processes of the station arrangement by means of Artificial Intelligence, or is superordinate to at least one of the fleet means or the work means arrangement.

8. The process controller of claim 7, wherein at least one of:
the means for planning processes of the station arrangement are configured for at least one of temporal planning or reverse planning;
at least one of the planning means, workstation allocating means, or transport vehicle allocating means operates while the station arrangement carries out processes;
execution by the processing means comprises commanding processes of the station arrangement or the at least two workstations of the station arrangement; or
observation by the processing means comprises monitoring processes of the station arrangement or the at least two workstations of the station arrangement.

9. The process controller of claim 1, wherein the fleet means comprises:
means for planning of stops of transport vehicles of the vehicle arrangement at various specified locations of the facility.

10. The process controller of claim 9, wherein at least one of:
the stop planning means is configured for temporal planning of stops;
the specified locations are at least one of workstations or charging stations; or
at least one of the communication means or the stop planning means operates while the station arrangement carries out processes.

11. The process controller of claim 1, wherein at least one work means of the work means arrangement is configured for communication with a station controller that is configured for at least one of controlling or monitoring at least one workstation of the station arrangement.

12. The process controller of claim 11, wherein at least one of:
the station controller is a programmable logic controller; or
the at least one work means is configured for communication with the station controller while the station arrangement carries out processes.

13. The process controller of claim 1, wherein means for communication with the vehicle arrangement via at least one fleet manager communicates with the vehicle arrangement while the station arrangement is carrying out processes.

14. A system, comprising:
a facility that comprises a station arrangement comprising:
at least one workstation that is automated at least in part, and
a vehicle arrangement comprising at least one transport vehicle that is automated at least in part and is intended for transporting goods to be conveyed to, in, and/or from the station arrangement; and
a process controller according to claim 1 for controlling the facility.

15. A method for controlling a facility that includes a station arrangement, the station arrangement including at least one workstation that is automated at least in part, and a vehicle arrangement comprising at least one transport vehicle that is automated at least in part and is intended for transporting goods to be conveyed to, in, and/or from the station arrangement, the method comprising:
providing at least one of communication or synchronization between at least one of:
a processing means and a fleet means,
the processing means and a work means arrangement, or
the fleet means and the work means arrangement,
wherein:
the processing means is configured for at least one of planning, execution, or observation of processes of the station arrangement,
the fleet means is configured for at least one of planning, execution, or observation of movements of the vehicle arrangement, and
the work means arrangement includes at least one work means configured for communication with at least one workstation of the station arrangement; and
communicating, by the fleet means, with the vehicle arrangement via at least one fleet manager;
wherein the fleet means is configured to at least one of:
communicate with at least one transport vehicle of the vehicle arrangement alternatively via a selected one of several designated fleet managers, or
communicate with at least one first transport vehicle of the vehicle arrangement via a first fleet manager and with at least one second transport vehicle of the vehicle arrangement via a further fleet manager.

16. The method of claim 15, wherein the facility further includes a user means for inputting and/or outputting data by or to a user, the method further comprising:
providing communication between at least one of:
the user means and processing means,
the user means and fleet means, or
the user means and work means arrangement.

17. The method of claim 16, wherein at least one of the communication or synchronization is based on a service-oriented, protocol, in particular an OPC protocol, an OPC-UA protocol, or an OPC-UA-like protocol.

18. The method of claim 15, further comprising at least one of:
planning processes of the station arrangement using the processing means and based on at least one of starting products, end products, or process step sequences;
allocating, with the processing means, different workstations of the station arrangement for carrying out processes of the station arrangement; or
allocating, with the processing means, transport vehicles of the vehicle arrangement for carrying out processes of the station arrangement.

19. The method of claim 18, wherein at least one of:
planning processes of the station arrangement comprises at least one of temporal planning or reverse planning; or
allocating the transport vehicles occurs while the station arrangement carries out processes.

20. The method of claim 15, further comprising:
planning, by the fleet means, of stops of transport vehicles of the vehicle arrangement at various specified locations of the facility.

21. The method of claim 20, wherein at least one of:
planning the stops comprises temporal planning;
the specified locations comprise at least one of workstations or charging stations; or
planning the stops occurs while the station arrangement carries out processes.

22. The method of claim 15, further comprising:
communicating, by at least one work means of the work means arrangement, with a station controller that is configured to at least one of control or monitor at least one workstation of the station arrangement.

23. The method of claim 22, wherein communicating occurs while the station arrangement carries out processes.

24. The method of claim 15, wherein the processing means is at least one of:
- configured for centralized planning, executing, or observing processes of at least two workstations of the station arrangement that are automated at least in part,
- configured for planning, executing, or observing processes of the station arrangement by means of Artificial Intelligence, or
- is superordinate to at least one of the fleet means or the work means arrangement.

25. A computer program product for controlling a facility having at having a station arrangement including at least one workstation that is automated, at least in part, and a vehicle arrangement including at least one transport vehicle that is automated, at least in part, and is intended for transporting goods to be conveyed to, in, and/or from the station arrangement, the computer program product having program code stored in a non-transitory computer-readable medium that, when executed by a computer, causes the computer to:
- provide at least one of communication or synchronization between at least one of:
    - a processing means and a fleet means,
    - the processing means and a work means arrangement, or
    - the fleet means and the work means arrangement;
- wherein:
    - the processing means is configured for at least one of planning, execution, or observation of processes of the station arrangement,
    - the fleet means is configured for at least one of planning, execution, or observation of movements of the vehicle arrangement, and
    - the work means arrangement includes at least one work means configured for communication with at least one workstation of the station arrangement; and
- communicate, by the fleet means, with the vehicle arrangement via at least one fleet manager;
- wherein the fleet means is configured to at least one of:
    - communicate with at least one transport vehicle of the vehicle arrangement alternatively via a selected one of several designated fleet managers, or
    - communicate with at least one first transport vehicle of the vehicle arrangement via a first fleet manager and with at least one second transport vehicle of the vehicle arrangement via a further fleet manager.

26. A process controller for a facility having a station arrangement including at least one workstation that is automated, at least in part, and a vehicle arrangement including at least one transport vehicle that is automated, at least in part, and is intended for transporting goods to be conveyed to, in, and/or from the station arrangement, the process controller comprising:
- a processing means for at least one of planning, executing, or observing processes of the station arrangement;
- a fleet means for at least one of planning, executing, or observing movements of the vehicle arrangement; and
- a work means arrangement comprising at least one work means for communication with at least one workstation of the station arrangement;
- wherein the processing means and the fleet means are configured for at least one of communication or synchronization with one another.

27. A process controller for a facility having a station arrangement including at least one workstation that is automated, at least in part, and a vehicle arrangement including at least one transport vehicle that is automated, at least in part, and is intended for transporting goods to be conveyed to, in, and/or from the station arrangement, the process controller comprising:
- a processing means for at least one of planning, executing, or observing processes of the station arrangement;
- a fleet means for at least one of planning, executing, or observing movements of the vehicle arrangement; and
- a work means arrangement comprising at least one work means for communication with at least one workstation of the station arrangement;
- wherein at least one of:
    - the processing means and fleet means,
    - the processing means and work means arrangement, or
    - the fleet means and work means arrangement,
- are configured for communication with one another on the basis of a service-oriented protocol, in particular an OPC protocol, an OPC-UA protocol or an OPC-UA-like protocol.

* * * * *